No. 750,170. PATENTED JAN. 19, 1904.
A. H. COWLES.
METHOD OF ELECTRIC HEATING.
APPLICATION FILED NOV. 5, 1902.
NO MODEL.
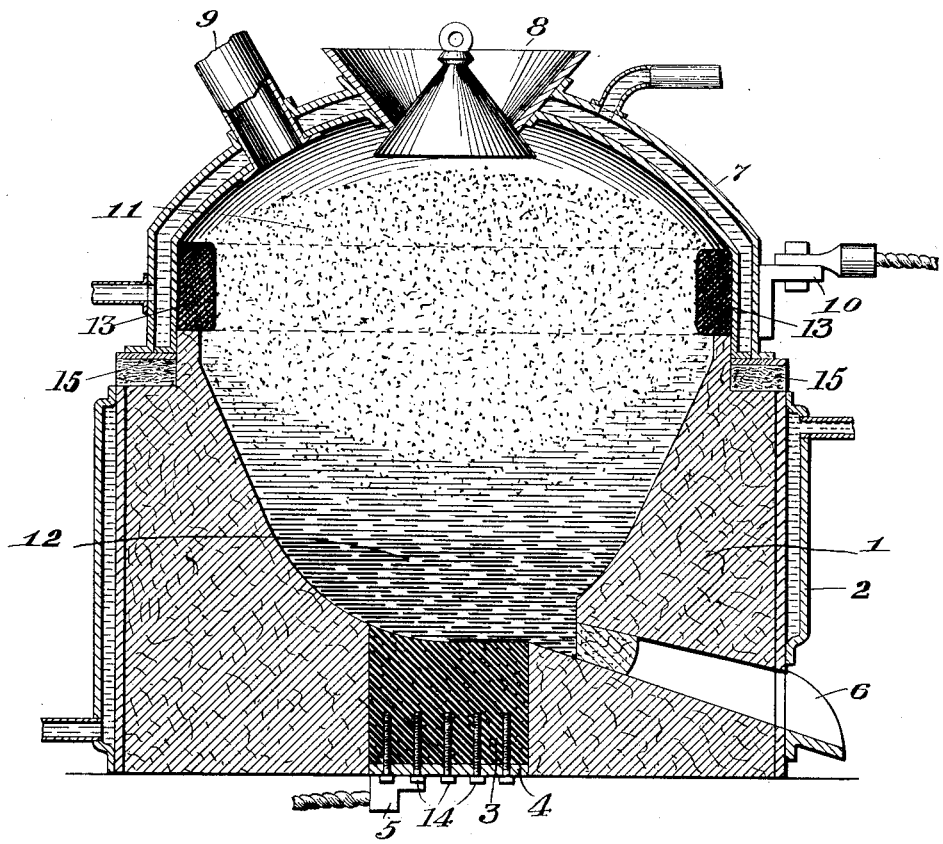
Witnesses:
Geo. E. Garrett
N. E. Neff
Inventor:
Alfred H. Cowles,
by Byrnes & Townsend,
Attorneys.

No. 750,170. Patented January 19, 1904.

UNITED STATES PATENT OFFICE.

ALFRED H. COWLES, OF CLEVELAND, OHIO.

METHOD OF ELECTRIC HEATING.

SPECIFICATION forming part of Letters Patent No. 750,170, dated January 19, 1904.

Application filed November 5, 1902. Serial No. 130,193. (No model.)

*To all whom it may concern:*

Be it known that I, ALFRED H. COWLES, a citizen of the United States, residing at Cleveland, in the county of Cuyahoga and State of Ohio, have invented certain new and useful Improvements in Methods of Electric Heating, of which the following is a specification.

This invention relates to the art of effecting reactions in electric furnaces, and particularly to the formation and withdrawal of calcium carbid.

The object of the invention is to provide a method wherein a body of conductive material in a molten state is interposed between electrodes to establish a path for the electric current and wherein a gradation in the density of the electric current flowing through such conductive body is secured.

A further object of the invention is to provide a method whereby calcium carbid may be produced and continuously or intermittently tapped from the furnace in a molten state.

Calcium carbid attains a fluidity sufficient to permit of tapping from the furnace only at very high temperatures, and one form of furnace in which such necessary high temperature may be maintained in the vicinity of the tap-hole is illustrated in the accompanying drawing, in which the figure is a transverse vertical section.

The furnace chosen for illustration comprises a circular body and hearth 1 of refractory non-conducting material, which, preferably, is of the same composition as the material being reduced, though it may be different, as would be the case if made of fire-brick. The sides of the hearth are incased by an iron water-jacket 2. An electrode 3, consisting of a carbon block, extends centrally up through the base of the furnace. Current is supplied to this electrode through a metal plate 4, covering the lower face of the electrode and having a terminal connection 5. Metal screw-bolts 14 extend from plate 4 up into the electrode to increase the surface of contact. A tap-hole 6 extends out through the hearth from a point at or near the bottom of the furnace. Resting upon the upper edge of the body is an iron cover 7 with double walls or their equivalent, between which water is circulated. A ring of insulation 15 is interposed between the hearth 1 with its water-jacket 2 and the cover 7. The sides of the cover have a carbon lining 13. The furnace has a bell and hopper charging mechanism 8 and an outlet-flue 9 for waste gases. The cover 7 has a terminal 10, which is also connected to the source of electric current, and thus constitutes the other electrode of the furnace, the electric current flowing between the carbon lining 13 of cover 7 and the carbon block 3.

In carrying out the process to produce calcium carbid an initial charge consisting of lime or limestone and carbon is fed into the furnace. In some instances and to provide for good conductivity I may employ the well-known charge containing pieces of coke or hard carbon, which lie in contact with each other at various points, and thereby afford direct paths for the flow of current, the lime being distributed in the interstices between the pieces of carbon. An electric current is passed through the charge, and the portion where the current density is sufficient is brought to a temperature which causes the materials to react to form carbid and the carbid to be brought into a molten condition.

The current employed is of sufficient volume to maintain within the furnace a body 12 of molten or partially-molten carbid and partly-reduced material sufficiently to nearly or quite fill the hearth 1. The partially-molten material may even extend up into contact with the carbon lining 13 of cover 7. The lines of current-flow converge from the upper to the lower electrode 3, giving a gradually-increasing current density and energy conversion downward through the pool of molten or partially-molten material. The heat evolved by the passage of the current through the pool thus gradually increases downward to the electrode 3, at which point it is a maximum. The molten carbid is tapped out from time to time and fresh material is fed into the furnace as required, the process thus being a continuous one. The waste gases serve to preheat the unreduced portion 11 of the charge, and being combustible may be removed and used for generating steam or for other purposes.

It is not essential that the charge should consist of a mixture which is normally a conductor. The process may be equally employed for the production of calcium carbid from a mixture of ground coke and lime. In this case, however, it is necessary to provide an initial conducting-path or to employ a higher voltage to start the operation. The charge will be preheated during the normal operation of the furnace by the waste gases and by conduction, convection, and radiation to a temperature which will enable it to act as a resistance-conductor before it descends into the path of current-flow.

The clause "maintaining in such pool a region of maximum current density," as used in the claims, is intended to mean that the current density increases from one portion of the pool to another until it reaches a maximum.

The furnace described in connection with this process is claimed in my copending application, Serial No. 132,134, filed November 20, 1902.

I claim—

1. The herein-described process which consists in passing an electric current through a pool of conductive material, maintaining in such pool a region of maximum current density, feeding into contact with such pool a suitable charge, and withdrawing the product from the region of maximum current density, as set forth.

2. The herein-described process which consists in passing an electric current through a pool of conductive material of varying cross-section, thereby maintaining in such pool a region of maximum current density, feeding into contact with such pool a suitable charge, and withdrawing the product from the region of maximum current density, as set forth.

3. The herein-described process which consists in passing an electric current through a pool of calcium carbid, maintaining in such pool a region of maximum current density, feeding into contact with such pool a suitable charge, and withdrawing the product from the region of maximum current density, as set forth.

4. The herein-described process which consists in passing an electric current through a pool of calcium carbid of varying cross-section, thereby maintaining in such pool a region of maximum current density, feeding into contact with such pool a suitable charge, and withdrawing the product from the region of maximum current density, as set forth.

5. The herein-described process of making calcium carbid which consists in passing an electric current through a pool of conductive material, maintaining in such pool a region of maximum current density, feeding into contact with such pool a mixture of a calcium compound and carbon, thereby producing calcium carbid, and withdrawing the carbid from the region of maximum current density, as set forth.

6. The herein-described process of making calcium carbid which consists in passing an electric current through a pool of conductive material of varying cross-section, thereby maintaining in such body a region of maximum current density, feeding into contact with such pool a mixture of a calcium compound and carbon, thereby producing calcium carbid, and withdrawing the carbid from the region of maximum current density, as set forth.

7. The herein-described process of making calcium carbid which consists in passing an electric current through a pool of calcium carbid, maintaining in such pool a region of maximum current density, feeding into contact with such pool a mixture of a calcium compound and carbon, thereby producing calcium carbid, and withdrawing the carbid from the region of maximum current density, as set forth.

8. The herein-described process which consists in passing an electric current through a pool of calcium carbid of varying cross-section, thereby maintaining in such body a region of maximum current density, feeding into contact with such pool a mixture of a calcium compound and carbon, thereby producing calcium carbid, and withdrawing the carbid from the region of maximum current density, as set forth.

9. The herein-described process which consists in passing an electric current through a pool of conductive material, maintaining in such pool a region of maximum energy density, feeding into contact with such pool a suitable charge, and withdrawing the product from the region of maximum energy density, as set forth.

10. The herein-described process which consists in passing an electric current through a pool of conductive material of varying cross-section, thereby maintaining in such pool a region of maximum energy density, feeding into contact with such pool a suitable charge, and withdrawing the product from the region of maximum energy density, as set forth.

11. The herein-described process which consists in passing an electric current through a pool of calcium carbid, maintaining in such pool a region of maximum energy density, feeding into contact with such pool a suitable charge, and withdrawing the product from the region of maximum energy density, as set forth.

12. The herein-described process which consists in passing an electric current through a pool of calcium carbid of varying cross-section, thereby maintaining in such pool a region of maximum energy density, feeding into contact with such pool a suitable charge, and withdrawing the product from the region of maximum energy density, as set forth.

13. The herein-described process of making calcium carbid which consists in passing an electric current through a pool of conductive material, maintaining in such pool a region of maximum energy density, feeding into contact with such pool a mixture of a calcium compound and carbon, thereby producing calcium carbid, and withdrawing the carbid from the region of maximum energy density, as set forth.

14. The herein-described process of making calcium carbid which consists in passing an electric current through a pool of conductive material of varying cross-section, thereby maintaining in such body a region of maximum energy density, feeding into contact with such pool a mixture of a calcium compound and carbon, thereby producing calcium carbid, and withdrawing the carbid from the region of maximum energy density, as set forth.

15. The herein-described process of making calcium carbid which consists in passing an electric current through a pool of calcium carbid, maintaining in such pool a region of maximum energy density, feeding into contact with such pool a mixture of a calcium compound and carbon, thereby producing calcium carbid, and withdrawing the carbid from the region of maximum energy density, as set forth.

16. The herein-described process which consists in passing an electric current through a pool of calcium carbid of varying cross-section, thereby maintaining in such body a region of maximum energy density, feeding into contact with such pool a mixture of a calcium compound and carbon, thereby producing calcium carbid, and withdrawing the carbid from the region of maximum energy density, as set forth.

In testimony whereof I affix my signature in presence of two witnesses.

ALFRED H. COWLES.

Witnesses:
F. W. POWER,
A. J. FRITH.